US012797723B2

(12) United States Patent
Takeda

(10) Patent No.: US 12,797,723 B2
(45) Date of Patent: Nov. 17, 2026

(54) REPLAY SYSTEM, PROCESSING METHOD, AND REPLAY PROGRAM

(71) Applicant: Yuta Takeda, Kyoto (JP)

(72) Inventor: Yuta Takeda, Kyoto (JP)

( * ) Notice: Subject to any disclaimer, the term of this patent is extended or adjusted under 35 U.S.C. 154(b) by 337 days.

(21) Appl. No.: 18/699,828

(22) PCT Filed: Jan. 30, 2023

(86) PCT No.: PCT/JP2023/002778
§ 371 (c)(1),
(2) Date: Sep. 26, 2024

(87) PCT Pub. No.: WO2023/157618
PCT Pub. Date: Aug. 24, 2023

(65) Prior Publication Data

US 2025/0325906 A1 Oct. 23, 2025

(30) Foreign Application Priority Data

Feb. 18, 2022 (JP) ................................ 2022-023938

(51) Int. Cl.
*A63F 13/497* (2014.01)

(52) U.S. Cl.
CPC ................................ *A63F 13/497* (2014.09)

(58) Field of Classification Search
CPC ........ A63F 13/497; A63F 13/35; A63F 13/77; A63F 13/86
See application file for complete search history.

(56) References Cited

U.S. PATENT DOCUMENTS 10,997,240 B1 * 5/2021 Aschner ................ G06F 16/739
2005/0197098 A1 * 9/2005 Trossen .................. H04W 4/24
455/406

(Continued)

FOREIGN PATENT DOCUMENTS

JP 5393991 B2 1/2014
JP 5815073 B2 11/2015

OTHER PUBLICATIONS

International Search Report for corresponding International Application No. PCT/JP2023/002778 dated Apr. 11, 2023 and its English translation.

*Primary Examiner* — James S. McClellan
(74) *Attorney, Agent, or Firm* — Renner, Otto, Boisselle & Sklar, LLP

(57) ABSTRACT

A versatile replay system that enables reproduced play in various games and also allows users to play games themselves or insert new content during reproduced play.
A replay system including: a division module configured to divide the posted program into indivisible elements by which a single processing is allowed to be executed; an addition module configured to add a recording and reproduction module for detecting a specific processing executed on the user terminal to the posted program that has passed through the division module to make the posted program a modified program; and a recording module configured to, when the modified program is executed on the user terminal, record an execution result of the specific processing executed on the user terminal and detected by the recording and reproduction module, in association with the indivisible element.

3 Claims, 3 Drawing Sheets

(56) References Cited

U.S. PATENT DOCUMENTS

| | | | | |
|---|---|---|---|---|
| 2014/0228112 | A1* | 8/2014 | Laakkonen | G11B 27/32 463/31 |
| 2014/0364205 | A1* | 12/2014 | Obayashi | A63F 13/5375 463/31 |
| 2015/0202529 | A1* | 7/2015 | Paradise | A63F 13/352 463/31 |
| 2017/0001111 | A1* | 1/2017 | Willette | A63F 13/49 |
| 2017/0157512 | A1* | 6/2017 | Long | A63F 13/86 |
| 2020/0384369 | A1* | 12/2020 | Holmes | A63F 13/355 |
| 2022/0100512 | A1* | 3/2022 | Levit-Gurevich | G06F 9/30087 |

* cited by examiner

REPLAY SYSTEM, PROCESSING METHOD, AND REPLAY PROGRAM

This application is a national phase of International Application No. PCT/JP2023/002778 filed Jan. 30, 2023, which claims priority to Japan Application No. 2022-023938 filed Feb. 18, 2022, each of which is hereby incorporated herein by reference in its entirety.

PREAMBLE TO THE DESCRIPTION

Field

The present invention relates to a replay system that adds a replay function to a posted program, a processing method, and a storage medium storing a replay program.

Background

In recent years, there has been a demand to watch reproduced play that reproduces another person's game play. In addition, there is a demand for users themselves to not only watch, but also to resume play from a point in the middle of the reproduced play, or to insert new content such as sound data or image data into the reproduced play.

Systems that enable reproduced play of a specific game are described, for example, in Patent Literature 1 and Patent Literature 2. The system described in Patent Document 1 reproduces game play by using a configuration that accumulates and registers user operation codes from the start to the end of a game as key log data in units of game play. In addition, a client device of Patent Literature 2 reproduces game play by recording game status data (snapshot data representing content of a memory image managed by an emulator running the game and values of registers), and also allows users themselves to play a new game in the middle of reproduction.

CITATION LIST

Patent Literature

Patent Literature 1:5393991 B2
Patent Literature 2:5815073 B2

SUMMARY

Technical Problem

However, the system described in Patent Literature 1 is a system that is pre-equipped for a particular game and records key log data that meets the specifications of the particular game. As such, the system described in Patent Literature 1 cannot function outside of the specific game and does not enable reproduced play for a variety of games.

In addition, in a description in Patent Literature 2, a reproduced play program is executed using dedicated hardware called a client device. In other words, there is a limitation that without the use of this dedicated hardware, reproduced play is not possible. The reason for this is that general computer systems employ multi-threaded processing using multiple CPUs, and in order to maximize hardware performance, when processing is executed simultaneously and in parallel, even for the same program, a processing order is not always constant. Therefore, reproduced play has not been achieved without dedicated hardware.

The present invention has been made in view of the above-mentioned problems, and can contribute to a replay system that allows users themselves to play games and insert new content in the middle of reproduced play, as well as adding a function of being able to reproduce play on various games and devices.

Solution to Problem

A replay system according to the present invention is connected to at least one or more user terminals through a wired or wireless network to add a replay function to a posted program received from an external source, the replay system including a division module configured to divide the posted program into indivisible elements by which a single processing is allowed to be executed; an addition module configured to add a recording and reproduction module for detecting a specific processing executed on the user terminal to the posted program that has passed through the division module to make the posted program a modified program; and a recording module configured to, when the modified program is executed on the user terminal, record an execution result of the specific processing executed on the user terminal and detected by the recording and reproduction module, in association with the indivisible element.

With the above configuration, the modified program is composed by dividing into the indivisible elements by which a single processing is executed, so that no other processing are interrupted while an indivisible element is being executed. In a single-threaded environment, execution of the thread forming indivisible elements will be continued without changing the processing order in a thread, so that when the modified program is executed, the processing is not interrupted by another processing, nor is the processing order changed, and therefore the same processing is performed. Here, the recording and reproduction module detects the specific processing by user operation, for example, and records the execution result of the specific processing in the recording module in association with the indivisible element. Since the same processing is performed in the modified program divided into indivisible elements as described above, by recording this indivisible element in association with the execution result of the specific processing, regardless of specifications of hardware or software on which the program is executed, it is possible to reproduce the operations of other users, even if the user terminal has been changed. This makes it possible to add the replay function to the posted program.

Another aspect of the present invention is a processing method allowing a computer connected to at least one or more user terminals through a wired or wireless network to add a replay function to a posted program received from an external source, the processing method including: a first step in which a division module of the computer divides the posted program into indivisible elements by which a single processing is allowed to be executed; a second step in which an addition module of the computer adds a recording and reproduction module for detecting a specific processing executed on the user terminal to the posted program that has passed through the division module to make the posted program a modified program; and a third step in which, when the modified program is executed on the user terminal, a recording module of the computer records an execution result of the specific processing executed on the user terminal and detected by the recording and reproduction module, in association with the indivisible element.

Yet another aspect of the present invention is a storage medium storing therein a replay program allowing a computer connected to at least one or more user terminals through a wired or wireless network to add a replay function to a posted program received from an external source, the replay program causing the computer to execute: a first step of dividing, with a division module, the posted program into indivisible elements by which a single processing is allowed to be executed; a second step of adding, with an addition module, a recording and reproduction module for detecting a specific processing executed on the user terminal to the posted program that has passed through the division module to make the posted program a modified program; and a third step of recording, with a recording module, when the modified program is executed on the user terminal, an execution result of the specific processing executed on the user terminal and detected by the recording and reproduction module, in association with the indivisible element.

Advantageous Effects of Invention

The present invention enables reproduced play in various games and provides a replay system that allows users themselves to play a game or insert new content during reproduced play.

DESCRIPTION OF EMBODIMENTS

A replay system of the present invention is described in detail below using the drawings.

A replay system 1 of the present embodiment provides a replay function to a posted program posted by a contributor. More specifically, the replay system 1 provides the posted program with a function that allows a replay operation, reproducing an operation executed on a first user terminal, to be reproduced on a second user terminal when the posted program is executed on the first user terminal.

Figure 1:
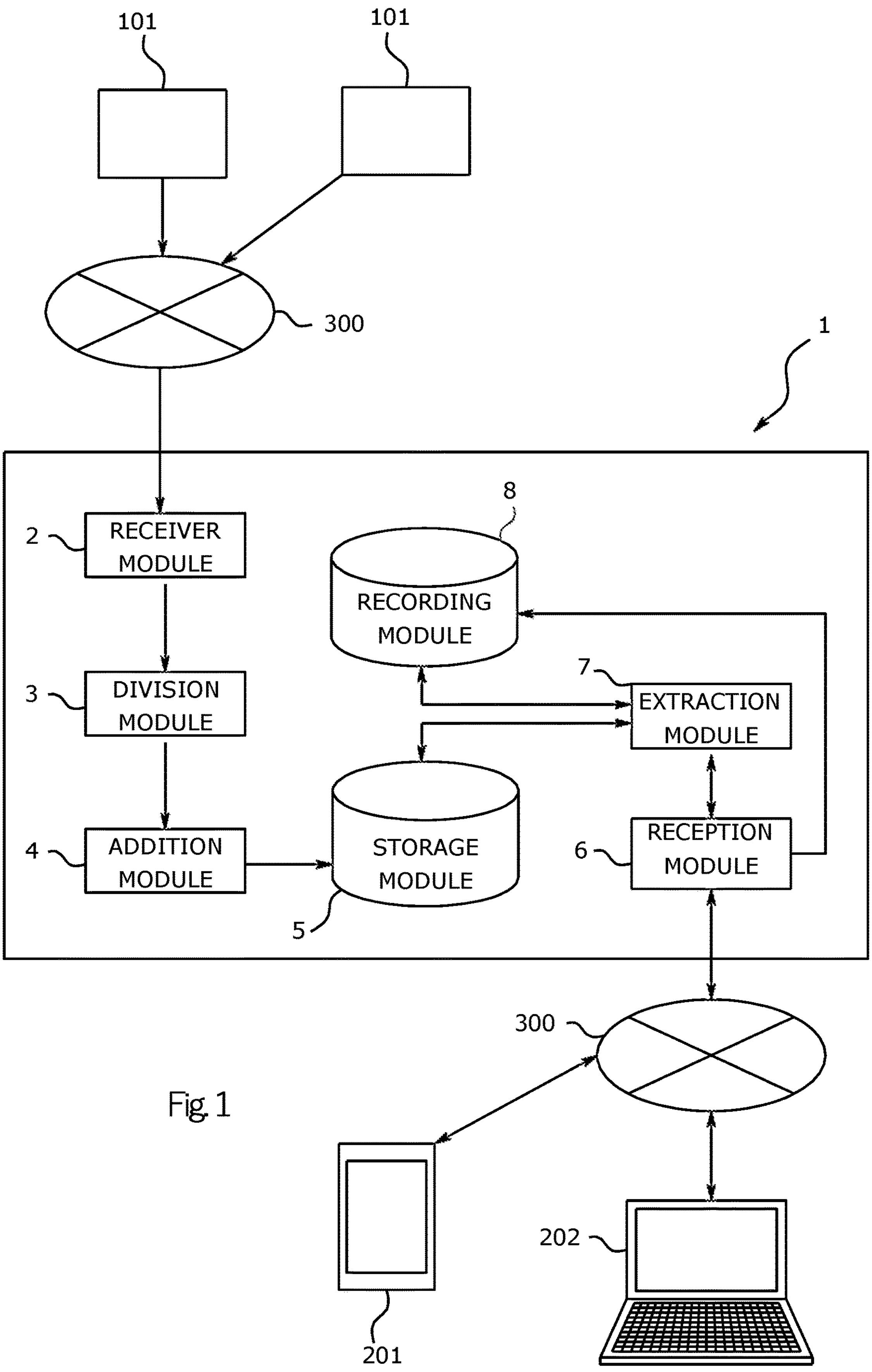
FIG. 1 is a block diagram of a replay system in the present embodiment.

As illustrated in FIG. 1, the replay system 1 of the present embodiment is connected to a contributor terminal 101 of the program contributor and user terminals 201 and 202 of users through a communication line consisting of a relay device 300 or the like that mediates wired or wireless network communication.

The contributor terminal 101 is a smartphone, a tablet terminal, a PC, etc., for example, equipped with a CPU, a memory, a communication port, a network interface, etc. not illustrated in the drawings, which creates a program using source code of JavaScript (registered trademark), TypeScript, etc. In the present embodiment, it is assumed that code of the posted program is written in JavaScript (registered trademark). In FIG. 1, two contributor terminals 101 are depicted, but the number of contributor terminals 101 is not particularly limited and one or a plurality of two or more contributor terminals may be included.

Here, if the program code is written in JavaScript (registered trademark), a processing is executed in a single thread. Therefore, the processing of the posted program is executed from the start to the end of the processing without switching the processing order among threads.

The user terminals 201 and 202 are, for example, smartphones, tablet terminals, PCs, etc., equipped with CPUs, memory, communication ports, network interfaces, etc., not illustrated in the drawings. Incidentally, for the user terminals 201 and 202, an application programming interface (hereinafter referred to as API), which is a convention for calling functions of programs pre-input in the user terminals 201 and 202 themselves and data managed by the user terminals is disclosed. Therefore, a program developer uses this API to develop programs to be executed on the user terminals 201 and 202. Although two user terminals 201 and 202 are depicted in FIG. 1, the number of user terminals is not particularly limited and one or a plurality of two or more user terminals may be included.

A configuration of the replay system 1 of the present embodiment is described in detail below.

The replay system 1 of the present embodiment is a server including a CPU, a memory, an A/D converter, a communication port, a network interface, etc. By installing a predetermined program in the memory, the server functions as a receiver module 2, a division module 3, an addition module 4, a storage module 5, a recording module 8, a reception module 6, and an extraction module 7 illustrated in FIG. 1.

The receiver module 2 receives the posted program transmitted from the contributor terminal 101 and transmits the posted program to the division module 3. This posted program is developed using the API described above.

The division module 3 divides the posted program transmitted from the receiver module 2 into indivisible elements by which a single processing is allowed to be executed. Here, an indivisible element means a divided program unit with which, when the thread forming the indivisible element is executed, no other processing is executed.

For example, assume that a thread forming the following code is present in the posted program.

```
Function f1( ){
  doSomething1( );
  setInterval(function f2( ){
    doSomething2( );
  },0);
}
```

In this code, the function f2 is defined within the function f1, and the set Interval function may cause another processing to be executed between the execution of f1 and the execution of the function f2. In other words, other processing may be executed before the processing defined by the above code is completed. In this case, the division module 3 rewrites the code as follows to divide the above program into indivisible elements.

```
function f1(indivisible element):
doSomething1( );
setInterval(f2,0);
function f2(indivisible element):
doSomething2( );
```

Modification of the posted program performed by the division module 3 is not limited to cases where a function is defined inside a function as in the example above. Other examples of modification of the posted program by the division module 3 include cases in which keywords such as yield, sync, and await are described in the code of the posted program, cases in which the posted program is linked to communication functions such as fetch and xmlhttprequest, and cases in which control functions such as setTimeout or classes such as Promise are used.

The division module 3 transmits the posted program that has been subjected to the above-mentioned processing to the addition module 4.

The addition module 4 adds a recording and reproduction module for detecting a specific processing executed on the user terminals 201 and 202 to the posted program that has passed through the division module 3 to make the posted program a modified program. Details of the recording and reproduction module are described below.

The storage module 5 stores the modified program transmitted from the addition module 4. At least one or more modified programs are stored in this storage module 5. The modified program to be stored in the storage module 5 may be stored in association with a contributor ID, posting date and time data, etc.

The reception module 6 accepts play data and requests transmitted from the user terminals 201 and 202, and transmits the play data to the recording module 8 and the requests to the extraction module 7. The reception module 6 also accepts the modified program or the play data transmitted from the extraction module 7 and transmits the modified program or the play data to the user terminals 201 and 202.

The extraction module 7 accepts the requests from the user terminals 201 and 202 and extracts the modified program requested by the user terminals 201 and 202 from the storage module 5, or extracts the play data requested by the user terminals 201 and 202 from the recording module 8, and transmits the modified program or the play data to the reception module 6. At this time, the extraction module 7 may extract the modified program and the play data using the contributor ID and the posting date and time data associated with the modified program and a user ID and play date and time data associated with the play data.

The recording module 8 accepts and records the play data transmitted from the reception module 6. Here, when the modified program is executed on the user terminals 201 and 202, the play data transmitted from the reception module 6 is an execution result of the specific processing executed on the user terminals 201 and 202 and detected by the recording and reproduction module (hereinafter described as "user terminal execution result").

Note that the recording module 8 may also record, for example, user IDs assigned to the user terminals 201 and 202, a play date and time when the modified program was executed on the user terminal, an elapsed time since the modified program was executed, communication between the user terminals 201 and 202 and other servers (not illustrated), and images, videos, etc., displayed on the user terminals 201 and 202, in association with the user terminal execution result and the indivisible element. In the present embodiment, the recording module 8 records the user terminal execution result in association with the indivisible element, the elapsed time, and the user ID.

Now, the following is a detailed description of the recording and reproduction module that is added to the posted program by the addition module 4.

In addition to detecting the specific processing executed on the user terminals 201 and 202, the recording and reproduction module acquires play data recorded in the replay system 1, creates a play data program that adds play data to the modified program in the user terminals 201 and 202, and executes the play data program, thereby reproducing operations of other users in the posted program that has passed through the division module 3. The recording and reproduction module functions as either a record mode, a replay mode, or a normal mode in the user terminals 201 and 202.

The record mode is for recording an operation processing in the user terminals 201 and 202. When functioning as the record mode, the recording and reproduction module detects the specific processing executed on the user terminals 201 and 202, executes that processing, and transmits, to the recording module 8, the execution result (the user terminal execution result) in association with the indivisible element that was being executed just before the recording and reproduction module detected the specific processing.

Here, the specific processing is a processing that a user executes while the user terminal is executing the modified program, or a processing caused by the execution of the modified program. Examples of this processing include initial loading, user operation, asynchronous processing, communication with other servers, image display, video display, random number generation, and data transmission/reception with another thread. The recording and reproduction module may send the user terminal execution result to the recording module 8 in association with a time at the user terminals 201 and 202, a location where a click, etc. has been made, and the user ID, etc., in addition to the indivisible element described above.

The replay mode reproduces the play data program played by other users with the user terminals 201 and 202. In the replay mode, the recording and reproduction module requests play data selected on the user terminals 201 and 202 from the replay system 1.

In the replay system 1, the reception module 6 accepts the request, and the extraction module 7 extracts the requested play data from the recording module 8 and transmits the play data to the reception module 6. The reception module 6 then transmits the play data to the user terminals 201 and 202.

On the user terminals 201 and 202 that receive the play data, the recording and reproduction module adds the play data to the modified program to create the play data program, and the play data program is then executed. Here, since the play data program has the execution results executed by other users added to a predetermined indivisible element, when the play data program is executed, the execution results executed by other users are executed on the user terminals 201 and 202, and the operations of other users are replayed on the user terminals 201 and 202.

In the replay mode, the recording and reproduction module displays a replay end button on displays (not illustrated) of the user terminals 201 and 202. When the user presses the replay end button, the recording and reproduction module ends the replay mode and functions as the record mode described above or the normal mode described below, and invalidates the play data. This allows the user to initiate his or her own operation at any desired timing.

The normal mode is a mode in which the modified program is not recorded or reproduced in any way when the modified program is executed on the user terminals 201 and 202. In other words, the normal mode is a mode in which the user plays a purely modified program.

An implementation of the replay system 1 of the present embodiment including the configuration described above will be described in detail using the drawings. To describe the implementation of the replay system 1 of the present embodiment, a game is used as an example below. However, the implementation of the replay system 1 of the present embodiment is not limited to this example.

When a game developer develops a game and posts the game to the replay system 1 of the present embodiment as a posted program, the division module 3 divides the posted program into indivisible elements in the replay system 1 of the present embodiment. The addition module 4 then adds the recording and reproduction module to the posted program to create the modified program. The modified program is stored in the storage module 5.

Figure 2:
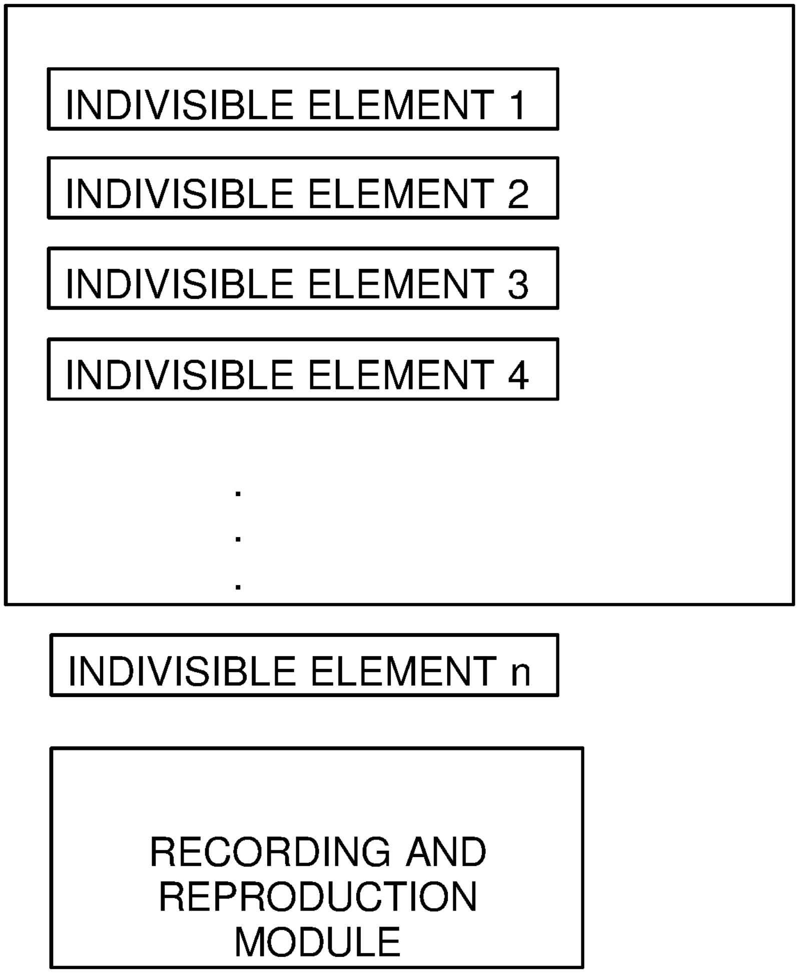
FIG. 2 is a diagram illustrating a modified program in the present embodiment.

The modified program is, for example, as illustrated in FIG. 2, a program including indivisible elements 1 through n, which are rewritten so that the posted program consists only of the indivisible elements, and the recording and reproduction module.

When the first user terminal 201 communicates with the replay system 1 of the present embodiment and requests the modified program, the reception module 6 accepts the request, and the extraction module 7 extracts the modified program and transmits the modified program to the first user terminal 201 through the reception module 6.

When the first user terminal 201 receives the modified program and the modified program is executed, the recording and reproduction module displays a screen for selecting the record mode, the replay mode, or the normal mode on a display (not illustrated) of the first user terminal 201.

The following describes a case where a first user selects the record mode.

Here, since the modified program is divided into indivisible elements by the division module 3 in advance, in a modified program executed in a single thread, no other processing is executed until the execution of the predetermined indivisible element is completed.

Therefore, if the first user, for example, performs an operation of pressing an A button while the modified program is being executed on the first user terminal 201, a processing executed by the operation of pressing the A button is not executed until the processing of the indivisible element that is being executed just before the operation of the first user pressing the A button is completed, and the processing to be executed by the operation of pressing the A button is executed after the processing of the indivisible element is completed.

Similarly, when the first user then performs a double-click operation, a processing executed by the double-click operation is not executed until the processing of the indivisible element that is being executed just before the operation of double-clicking by the first user, and the processing to be executed by the double-click operation is executed after the processing of the indivisible element is completed.

In the record mode, the recording and reproduction module detects a specific processing such as the first user's operation (that is pressing the A button or double-clicking in the example above), and transmits an execution result (that is the result of the processing executed by pressing the A button or double-clicking in the example above and that is an example of "user terminal execution result") executed by the specific processing to the recording module 8 of the replay system 1 in association with the indivisible element that was being executed when the specific processing was detected.

At this time, not only the indivisible element can be associated with the user terminal execution result, but also the elapsed time since the modified program was executed, a date and time played, a random number, a position of a mouse click, the user terminal communication, the user ID, etc.

Specifically, the recording and reproduction module detects the operation in which the first user presses the A button, temporarily records an elapsed time 1 from the execution of the modified program until the detection of the operation and an execution result (hereinafter described as "user terminal execution result 1") of the processing executed by the operation of pressing the A button in a recording area of the user terminal (not illustrated in the drawings), in association with an indivisible element (hereinafter described as "indivisible element 1") being executed just before the operation of pressing the A button.

In addition to the detection of the double-click operation by the first user, an elapsed time 2 from the execution of the modified program until the detection of the operation and an execution result (hereinafter described as "user terminal execution result 2") of the processing executed by the double-click operation are temporarily recorded in the recording area (not illustrated in the drawings) of the user terminal in association with an indivisible element (hereinafter referred to as "indivisible element 2") being executed just before the double-click operation.

When the modified program is ended at the first user terminal 201, the recording and reproduction module compiles and transmits data including the user terminal execution result and the indivisible element associated with the user terminal execution result that are temporarily recorded in the recording area (not illustrated in the drawings) of the first user terminal 201 to the replay system 1. This data transmitted to the replay system 1 is called play data.

In the example above, the elapsed time 1 and the user terminal execution result 1 associated with the indivisible element 1, and the elapsed time 2 and the user terminal execution result 2 associated with the indivisible element 2 are transmitted as play data 1.

At this time, the recording and reproduction module may include in the play data a date and time when the modified program was executed, a random number obtained during the execution of the modified program, the position of the mouse click, communication and other data, the user ID, etc. In the present embodiment, the play data includes the date and time when the modified program was executed, the user ID, the random number data, and the mouse click position data, but the play data may also include, for example, time data, communication data, data transmitted/received from another thread, etc.

In the replay system 1, the recording module 8 records the play data 1 received through the reception module 6.

Next, a case where the replay mode is selected will be described, and in the following, a case where a second user reproduces the first user's play will be described.

First, when the second user terminal 202 communicates with the replay system 1 of the present embodiment and requests the modified program, the reception module 6 accepts the request, and the extraction module 7 extracts the modified program from the storage module 5 and transmits the modified program to the second user terminal 202 through the reception module 6.

When the second user terminal 202 receives the modified program and the modified program is executed, the recording and reproduction module displays a screen for selecting the record mode, the replay mode, or the normal mode on a display of the second user terminal 202.

When the second user selects the replay mode and requests the play data 1 played by the first user, the recording and reproduction module requests the first user's play data 1 from the replay system 1. In the replay system 1, the reception module 6 receives the request and the extraction module 7 extracts from the recording module 8 the play data 1 that matches, for example, the user ID and a date played, and transmits the play data 1 to the second user terminal 202 through the reception module 6.

At the second user terminal 202, the recording and reproduction module adds the play data 1 to the modified program to create the play data program, and the play data program is then executed.

Figure 3:
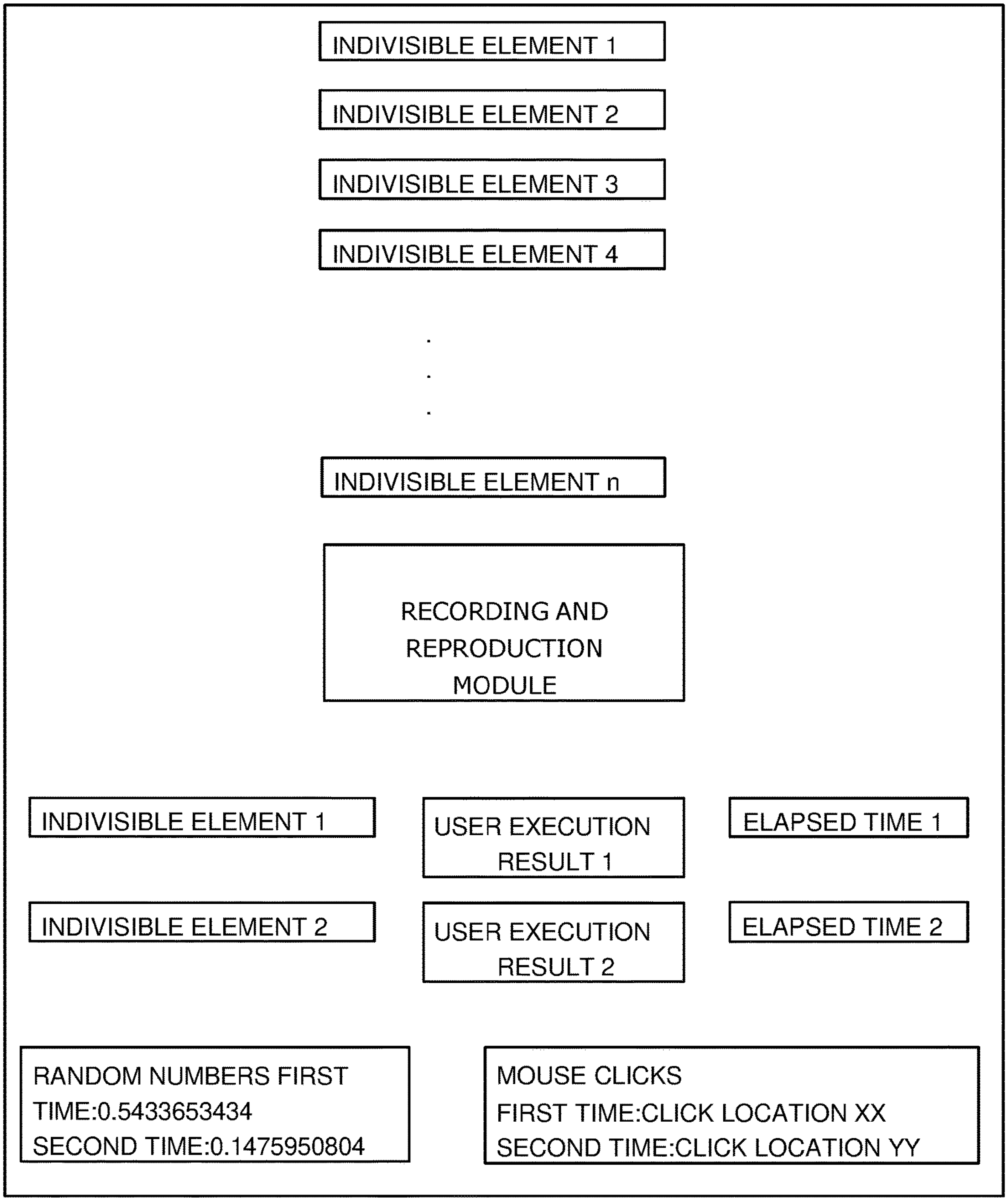
FIG. 3 is a diagram illustrating a play data program in the present embodiment.

As illustrated in FIG. 3, for example, this play data program consists of the modified program including the indivisible elements 1 through n and the recording and reproduction module, and the play data 1 (data with the elapsed time 1 and a user terminal execution result 1 associated with the indivisible element 1, data with the elapsed time 2 and a user terminal execution result 2 associated with the indivisible element 2, random numerical data, and the mouse click position data).

Therefore, when the play data program is executed, the user terminal execution result 1, i.e., the processing executed by the operation of pressing the A button, is executed just after the indivisible element 1 is executed on the second user terminal 202. In addition, the user terminal execution result 2, i.e., the execution result of the processing executed by the double-click operation, is executed just after the execution of the indivisible element 2.

This allows the first user's play to be reproduced in the second user terminal 202 because the result of the processing performed on the first user terminal 201 is executed on the second user terminal 202. Although not illustrated in FIG. 3, the play data 1 may include the communication data, data related to date and time, etc.

The recording and reproduction module also displays the replay end button on the display (not illustrated) of the second user terminal 202. When the second user presses the replay end button, the recording and reproduction module ends the replay mode and functions as the record mode or the normal mode. Then, all data associated with indivisible elements that have not been executed at the time the replay mode is ended are invalidated.

For example, if the execution result 1 of the first user terminal 201, i.e., the processing executed by the operation of pressing the A button, is executed after the processing of executing the indivisible element 1 and then the second user ends the replay mode, the recording and reproduction module ends the replay mode, changes to the record mode or the normal mode, and invalidates an operation of play data 2, i.e., deletes the user terminal execution result 2 and the elapsed time 2 associated with the indivisible element 2.

This allows the second user to perform their own play without reproducing the first user's operation. At this time, the recording and reproduction module may display a selection screen on the second user terminal 202 so that the second user can select the record mode or the normal mode. With the above configuration, the second user's own operation is initiated at the desired timing when the second user selects the replay end button.

Here, when the recording and reproduction module ends the replay mode and changes to the record mode, the recording and reproduction module retains the play data up to that time point (play data executed before the replay mode is ended), and transmits the execution result of a specific processing, such as user operation detected after the replay mode is ended to the recording module 8 of the replay system 1, in association with the indivisible element that was being executed when the specific processing was detected and transmitted.

Specifically, in the second user terminal 202, if the execution result 1 of the first user terminal 201 (the processing executed by the operation of pressing the A button) is executed after the processing of executing the indivisible element 1 and then the second user ends the replay mode, the recording and reproduction module ends the replay mode and changes to the record mode, as well as temporarily recording the elapsed time 1 and the user terminal execution result 1 associated with the indivisible element 1 in the recording area (not illustrated in the drawings) of the second user terminal 202, and invalidates all subsequent operations of the play data. In other words, the elapsed time 2 and the user terminal execution result 2 associated with the indivisible element 2 are deleted.

Subsequently, when the second user performs an operation of pressing a B button during the processing of the indivisible element 2, the recording and reproduction module detects this operation and also temporarily records the processing executed by the operation of pressing the B button on the indivisible element 2 (hereinafter described as "user terminal execution result 3") in the recording area (not illustrated in the drawings) in the second user terminal 202, together with an elapsed time 3 from the time when the modified program is executed until the time when the user terminal execution result 3 is executed.

When the play data program is ended, the recording and reproduction module compiles and transmits data including the user terminal execution result temporarily recorded in the recording area (not illustrated in the drawings) of the second user terminal 202 and the indivisible element associated with the user terminal execution result to the replay system 1.

In the above example, the elapsed time 1 and the user terminal execution result 1 associated with the indivisible element 1, and the elapsed time 3 and a user terminal execution result 3 associated with the indivisible element 2 are recorded in the recording module 8 as the play data 2. The recording module 8 records the play data 2 separately from the play data 1. At this time, as described above, the recording and reproduction module may include in the play data the date and time the modified program was executed, the random number obtained during the execution of the modified program, the position of the mouse click, the communication and other data, the user ID, etc.

The above configuration allows the user to switch to their own operation in the middle of the game even when the replay mode is selected, and this operation can be recorded as play data. Therefore, for example, if the first user's play was to defeat a monster and then reach a branching path and select right, but the second user wants to select left at the branching path instead of right, the second user can reproduce the play on the second user terminal 202 to the point where the first user defeated the monster, and by ending the replay mode and selecting the record mode or the normal mode, the second user can switch to his or her own play and select left at the subsequent branching path.

In this way, the game can be reproduced and switched to the user's own play in the middle of reproduction, thus increasing the user's freedom of operation.

Finally, a case where the normal mode is selected will be described.

When the first user selects the normal mode, the recording and reproduction module executes the modified program. In this case, the recording and reproduction module does not detect the specific processing, etc., and the first user can play the modified program as is.

In this replay system 1 of the present embodiment configured as described above, when the modified program is executed on the user terminals 201 and 202, the division module 3 divides the modified program into indivisible elements by which a single processing is to be executed, so that the execution of a thread forming an indivisible element is not interrupted by another processing.

When the program code is written in JavaScript (registered trademark), as in the present embodiment, a processing is executed in a single thread. Therefore, even in the modified program, the processing is executed from the start to the end of the processing without switching the processing order among the threads forming the respective indivisible elements. In this way, in the modified program, the execution of a thread forming an indivisible element is not interrupted by another processing, and the same processing is executed in the processing order of the threads forming respective indivisible elements.

In addition, the recording and reproduction module added by the addition module 4 detects the specific processing by user operation, for example, and records the execution result of the specific processing in the recording module 8 in association with the indivisible element. Since the same processing is performed in the modified program divided into indivisible elements as described above, by recording the execution result of the specific processing in association with the indivisible element, regardless of specifications of hardware or software on which the program is executed, it is possible to reproduce the operations of other users even if the user terminal has been changed. This adds a reproduction function to the posted program and also makes the reproduction function more versatile.

The present invention is not limited to the configuration described above.

The replay program described above may be stored on a recording medium.

In other words, this recording medium may be a storage medium storing therein a replay program allowing a computer connected to at least one or more user terminals through a wired or wireless network to add a replay function to a posted program received from an external source, the replay program causing the computer to execute: a first step of dividing, with a division module, the posted program into indivisible elements by which a single processing is allowed to be executed; a second step of adding, with an addition module, a recording and reproduction module for detecting a specific processing executed on the user terminal to the posted program that has passed through the division module to make the posted program a modified program; and a third step of recording, with a recording module, when the modified program is executed on the user terminal, an execution result of the specific processing executed on the user terminal and detected by the recording and reproduction module, in association with the indivisible element.

For example, in the embodiment described above, the elapsed time since the modified program was executed is associated with the indivisible element as play data, but the elapsed time need not be associated with the indivisible element. The elapsed time since the modified program was executed may be the elapsed time in seconds or milliseconds, or may be the elapsed time in frames.

Although the configuration of the present invention has been described assuming a single thread environment using JavaScript (registered trademark), it may be an execution environment that controls the processing order among other thread processes or that encompasses control of processing order among the threads.

Furthermore, in the above embodiment, the play data is temporarily stored in the recording area of the user terminal, but the play data may be permanently stored in the recording area of the user terminal. In this case, the play data is also transmitted to the replay system while the play data is stored in the recording area of the user terminal.

The present invention can be variously modified to the extent that modifications do not violate the gist of the invention.

INDUSTRIAL APPLICABILITY

When the modified program is executed, the same processing is performed without changing the processing order during the processing of a thread forming an indivisible element, enabling reproduced play in various games and allowing users to play a game themselves or insert new content during reproduced play.

REFERENCE SIGNS LIST

1 . . . Replay system
2 . . . Receiver module
3 . . . Division module
8 . . . Recording module

What is claimed is:

1. A replay system that is connected to at least one or more user terminals through a wired or wireless network to add a replay function that reproduces the execution results of a posted program received from an external source in a single-threaded environment, the replay system comprising:

a division module configured to divide the posted program into indivisible elements, each indivisible element being a unit in which no other process interrupts while a single processing is being executed;

an addition module configured to generate a modified program by adding, to the posted program processed by the dividing unit, code of a recording and reproduction module for reproducing operations performed on the user terminal; and a recording module configured to record execution results obtained when the modified program is executed on the user terminal, wherein the recording and reproduction module includes:

a record mode configured to, while the user terminal is executing the modified program, detect a specific event occurring at the user terminal and transmit, to the recording module, play data associating an execution result of processing of the detected event with the indivisible element that was being executed immediately before the event was detected; and a replay mode configured to, in response to a request from another user terminal, retrieve the play data from the recording module and add the retrieved play data to the modified program.

2. A processing method allowing a computer connected to at least one or more user terminals through a wired or wireless network to add a replay function that reproduces the execution results of a posted program received from an external source in a single-threaded environment, the processing method comprising:

a first step in which a division module of the computer divides the posted program into indivisible elements, each indivisible element being a unit in which no other process interrupts while a single process is being executed;

a second step in which an addition module of the computer generates a modified program by adding, to the posted program processed by the dividing unit, code of a recording and reproduction module for reproducing operations performed on the user terminal; and a third step in which, a recording module configured to record execution results obtained when the modified program is executed on the user terminal;

operating the recording and reproduction module in a record mode to, while the user terminal is executing the modified program, detect a specific event occurring at the user terminal and transmit, to the recording module, play data associating an execution result of processing of the detected event with the indivisible element that was being executed immediately before the event was detected; and operating the recording and reproduction module in a replay mode to, in response to a request from another user terminal, retrieve the play data from the recording module and add the retrieved play data to the modified program.

3. A non-transitory computer-readable storage medium storing therein a replay program allowing a computer connected to at least one or more user terminals through a wired or wireless network to add a replay function that reproduces execution results of a posted program received from an external source in a single-threaded environment, the replay program causing the computer to execute:

a first step of dividing, with a division module, the posted program into indivisible elements, each indivisible element being a unit in which no other process interrupts while a single process is being executed;

a second step of adding, with an addition module, a modified program by adding, to the posted program processed by the division module, code of a recording and reproduction module for reproducing operations performed on the user terminal; and a third step of recording, with a recording module, execution results obtained when the modified program is executed on the user terminal, wherein the recording and reproduction module includes:

a record mode configured to, while the user terminal is executing the modified program, detect a specific event occurring at the user terminal and transmit, to the recording module, play data associating an execution result of processing of the detected event with the indivisible element that was being executed immediately before the event was detected; and a replay mode configured to, in response to a request from another user terminal, retrieve the play data from the recording module and add the retrieved play data to the modified program.

* * * * *